Patented Feb. 17, 1942

2,273,320

UNITED STATES PATENT OFFICE 2,273,320

HYDROCARBON REACTIONS

Vladimir N. Ipatieff and Aristid V. Grosse, Chicago, Ill., assignors to Universal Oil Products Company, Chicago, Ill., a corporation of Delaware No Drawing. Application March 23, 1939, Serial No. 263,797

11 Claims. (Cl. 260—683)

This invention is particularly related to reactions which occur between olefinic hydrocarbons and cycloparaffins having less than 5-carbon atoms in the ring.

More specifically the invention is concerned with catalytic processes for the production of higher molecular weight mono-olefinic hydrocarbons by the addition of olefins of alkyl groups through the agency of unstable cycloparaffins.

The art of synthesizing organic compounds and particularly those of a hydrocarbon character with which the present invention is concerned is important in view of the fact that special hydrocarbons in any one series may have peculiar characteristics rendering them suitable for use either as a basis for the development of useful derivatives or for direct use in hydrocarbon mixtures, such as, for example, those employed as fuels for internal combustion engines, lubricants, etc.

In one specific embodiment the present invention comprises a process for the production of mono-olefins by subjecting mixtures of olefins and cycloparaffins containing 3 and 4-carbon membered rings to contact with a substance selected from the group of condensation catalysts comprising sulfuric acid, phosphoric acid, "solid phosphoric acid," aluminum chloride, zirconium chloride, boron fluoride, and activated clay.

According to the present invention the olefinic hydrocarbons which are to be reacted with the cycloparaffins may comprise any one of the series of which ethylene is the simplest and in which the homologs differ by a methylene or $CH_2$ group. Either the normal or the iso-olefins may be treated, although in most instances the branched isomers are the more reactive.

The olefins necessary for the process of the present invention may be recovered by suitable means from the products of petroleum cracking, both gaseous and liquid. The preparation of a fraction containing propene and propane is a simple matter since these substances may be fractionated readily from admixture with butenes and butanes. Isobutene, normal butenes, and butanes are present in the 4-carbon atom fractions of refinery gases from which the different olefinic constituents may be separated to a substantial degree by fractional distillation and solvent extraction.

Isobutene may be produced also by the dehydrogenation of isobutane, or it may be formed by the dehydration of isobutyl or tertiary butyl alcohols by passage over such catalysts as hot activated alumina. Some normal butenes in admixture with butanes remain after isobutene has been removed from butane-butene fractions by treatment with sulfuric acid solutions, or by polymerization in the presence of solid phosphoric acid catalysts. Pentenes with straight or branched chain may be formed by the dehydrogenation of normal pentane and isopentane, respectively, in the presence of suitable catalysts, or they may be produced by the catalytic dehydration of the straight or branched chain amyl alcohols.

Cycloparaffins needed for the process may be produced by the action of metals, such as zinc, magnesium, or sodium on dihalogen derivatives of propane and butane, respectively, in which the halogen substitution is on the end carbon atoms, or by other synthetic methods. The principal properties of some of the cycloparaffins containing 3 and 4-carbon atoms in the ring are given below:

| Compound | Boiling point | Specific gravity |
| --- | --- | --- |
|  | ° C. | ° C. |
| Cyclopropane | −32.8 | 0.720 @ −79 |
| Methylcyclopropane | +5 | 0.691 @ −20 |
| 1,1-dimethylcyclopropane | 21 | 0.6604@ 20 |
| 1,2-dimethylcyclopropane | 33.0 | 0.6754@ 22 |
| Ethylcyclopropane | 36.5 | 0.6864@ 18 |
| 1,1,2-trimethylcyclopropane | 52.8 | 0.6950@ 20 |
| 1-methyl-2-iso-propylcyclopropane | 81 | 0.7102@ 20 |
| Cyclobutane | 13 | 0.703 @ 0 |
| Methylcyclobutane | 36.5 | 0.6950@ 18 |
| Ethylcyclobutane | 70 | 0.7284@ 20 |

Since cyclopropane, methylcyclopropane, and cyclobutane shown in the preceding table are gaseous at ordinary temperatures, the methods of operation whereby they are reacted with olefinic hydrocarbons are relatively simple and consist generally in passing the 3- or 4-carbon membered cycloparaffin, together with the olefinic hydrocarbon, into a suitable solvent, such as a paraffinic hydrocarbon, containing suspended finely divided anhydrous aluminum chloride, or other catalytically active metal halide, such as, for example, zirconium chloride. The effective action of such a catalyst requires the concurrent use of a small proportion of a hydrogen halide, such as hydrogen chloride and this compound is preferably admitted to the reaction zone in admixture with the cycloparaffin.

Such reactions between olefins and cycloparaffins are usually effected under a pressure in the approximate range of 5–25 atmospheres and at a temperature in the approximate order of −30 to 50° C. when aluminum chloride is the catalyst, and at approximately 0–100° C. when zirconium chloride is the catalyst employed.

The operation of this invention may be conducted according to the batch system in which the mixture of cycloparaffin, olefin, and hydrogen halide is passed into a suitable solvent until the desired degree of interaction is effected in the presence of the catalyst, or continuous systems may be employed in which the cycloparaffin, olefin, and hydrogen halide are passed through a suitable reactor containing the metal halide catalyst as such, or supported by a suitable carrier. After a batch condensation reaction, the solid catalytic material is allowed to settle, the supernatant liquid is decanted and fractionally distilled for the recovery of individual compounds or of selected fractions. The recovered condensation products may be washed with alkalies to remove traces of halogen acids, and the settled catalyst particles may be put through any recovery process necessary to bring them back to a condition satisfactory for further catalytic service.

Other solid catalytic agents suitable for effecting interaction of cycloparaffins with olefins comprise the so-called "solid phosphoric acid" catalyst and activated clays, of which floridin is representative. These solid materials are utilized preferably in granular form as fillers for suitable reaction tubes or chambers through which the reactants may be passed with or without a suitable diluent. The rate of passage of the hydrocarbons and the catalyst temperature and pressure are controlled so as to obtain the desired reaction between olefin and cycloparaffin.

The so-called "solid phosphoric acid" catalyst used in one modification of the process of this invention is described in United States Patent No. 1,993,513 and others, in connection with other processes directed to the conversion of normally gaseous olefins into liquid motor fuel. This "solid phosphoric acid" catalyst may be made by the successive steps of (1) mixing an acid of phosphorus with a finely divided and relatively inert, generally siliceous adsorbent, such as, for example, kieselguhr to form a rather wet paste (the acid ordinarily being in major proportion by weight); (2) calcining at temperatures of the order of 400–500° C. to produce a solid cake; (3) grinding and sizing to produce particles of usable mesh; and (4) rehydrating the catalyst granules at temperatures of the order of 260° C. and atmospheric pressure to produce an acid composition corresponding to optimum polymerizing activity. This procedure may be varied by forming particles from the original paste by extrusion or pelleting methods and following with the calcining and rehydrating steps. In the reactions taking place during calcining it is evident that some of the acid is "fixed" on the carrier and that some meta-phosphoric acid, which is substantially without polymerizing activity, is formed. The rehydrating step evidently produces an acid composition corresponding closely to the pyro-acid having a formula $H_4P_2O_7$ and corresponding to the double oxide formula $P_2O_5.2H_2O$.

The "solid phosphoric acid" catalysts used in the present invention are characterized by the fact that they are calcined before use both to fix the composition of the acid and to form particles of a granular structure capable of withstanding the conditions of service to which they are subjected. When these catalysts become coated with carbonaceous deposits they can be reactivated by oxidation with air or with gas mixtures of controlled oxygen concentration at temperatures of the approximate order of 425–550° C. followed by contacting with superheated steam at about 230–290° C. under atmospheric pressure to rehydrate the acid to the most desirable composition. Rehydration at higher temperatures may be made under steam pressures corresponding approximately to the water vapor pressure of the catalyst at the operating temperature.

Suitable conditions of operation for producing mixed products of cycloparaffins and olefins in the presence of a "solid phosphoric acid" catalyst are temperatures of the approximate order of 120–320° C. and pressures in the approximate range of 10–40 atmospheres. Similar operation at approximately 100–225° C. may be employed for effecting such interaction in the presence of raw or acid treated clay. Following the reaction step the products are fractionated to recover any unconverted charging materials which may be recycled to further contact with the catalyst, and to separate desired fractions which may be utilized in further hydrocarbon reactions, or in syntheses of other products.

Other catalysts suitable for this reaction are phosphoric acid, sulfuric acid, and boron fluoride. The first two are liquid and the last gaseous. They may be utilized in suitable pressure vessels preferably equipped with an agitator in which an olefin and a cycloparaffin, such as cyclopropane, cyclobutane, or one of their alkylated derivatives, may be contacted under a pressure in the approximate range of 5–25 atmospheres. Approximately 60–90% sulfuric acid may be so employed as catalyst at a temperature in the approximate range of −30 to 100° C.; while 75–100% orthophosphoric acid may be used similarly at a temperature of the order of 25–200° C. The normally gaseous catalyst, boron fluoride, may be utilized at a temperature of the order of −30 to 150° C. After any of these treatments the catalyst and hydrocarbon layers are separated and the latter subjected to fractionation for the recovery of individual compounds or close cuts. Obviously operations may be conducted either in batch or continuous systems.

The products may be washed with caustic soda or other alkalies to remove acids or acid products of the reactions and the spent acid catalyst may be treated by any necessary method to restore it to a condition fitting it for further service.

Each of the different substances which may be used alternatively as catalyst for the interaction of olefins and cycloparaffins will require its particular operating conditions for effecting the desired reaction, since these materials are not of equal catalytic activity. It is within the scope of this invention to choose the catalyst upon the basis of the reactivities of the hydrocarbons involved. Thus a catalyst of high activity may be used with hydrocarbons that undergo interaction with difficulty, while a catalyst of relatively low activity may be employed with substances that interact readily.

The following example is given to show the type of results normally obtainable in the practice of the process, although not with the intention of imposing exactly corresponding limitations upon the broad scope of the invention:

Fifty parts by weight of cyclopropane and 50 parts by weight of propane were charged into an autoclave containing 10 parts by weight of boron fluoride and one part by weight of nickel powder.

The reaction, carried out at 50° C. under a pressure of 20 atmospheres, was so rapid that complete conversion to a colorless liquid occurred within one hour. After cooling of the reaction vessel, the excess boron fluoride was discharged therefrom, the liquid products were removed from the autoclave, washed with caustic soda solution and water, and then dried and distilled. Of the distilled liquid products, 65% boiled within the range of gasoline and had an octane number of 80. According to analytical data and determinations of bromine numbers and refractive indices, the reaction products consisted of mono-olefins containing isomeric hexenes, nonenes, and higher multiples of $C_3H_6$.

The nature of the process of the present invention and its practical application are evident from the preceding specification and illustrative data presented, although neither section is intended to unduly limit its generally broad scope.

We claim as our invention:

1. A process for the production of liquid olefinic hydrocarbons which comprises subjecting a normally gaseous olefin and a cycloparaffin having less than 5-carbon atoms in the ring to contact with aluminum chloride and hydrogen chloride at a temperature of the approximate order of −30 to 50° C. under a pressure in the approximate range of 5–25 atmospheres.

2. A process for the production of liquid olefinic hydrocarbons which comprises subjecting a normally gaseous olefin and a cycloparaffin having less than 5-carbon atoms in the ring to contact with a precalcined mixture of an acid of phosphorus and a finely divided, generally siliceous adsorbent at a temperature of the approximate order of 120–230° C. under a pressure of the approximate order of 10–40 atmospheres.

3. A process for the production of liquid olefinic hydrocarbons which comprises subjecting a normally gaseous olefin and a cycloparaffin having less than 5-carbon atoms in the ring to contact with a precalcined mixture of pyrophosphoric acid and diatomaceous earth at a temperature of the approximate order of 120–230° C. under a pressure of the approximate order of 10–40 atmospheres.

4. A process for the production of liquid olefinic hydrocarbons which comprises subjecting a normally gaseous olefin and a cycloparaffin having less than 5-carbon atoms in the ring to contact with 75–100% orthophosphoric acid at a temperature of the approximate order of 25–200° C. under a pressure of the approximate order of 5–25 atmospheres.

5. A process for the production of liquid olefinic hydrocarbons which comprises subjecting a normally gaseous olefin and a cycloparaffin having less than 5-carbon atoms in the ring to contact with boron fluoride at a temperature of the approximate order of −30 to 150° C. under a pressure of the approximate order of 5–25 atmospheres.

6. A process for producing mono-olefins which comprises reacting an olefin with a cycloparaffin of less than five carbon atoms in the ring in the presence of a condensation catalyst.

7. A process for producing a higher molecular weight mono-olefin hydrocarbon from a lower molecular weight olefin hydrocarbon and a cycloparaffin which comprises reacting an olefin with a cycloparaffin of less than five carbon atoms in the ring in the presence of a condensation catalyst under selected pressure and temperature conditions effective for the condensation reactions in accordance with the starting hydrocarbons and condensation catalyst employed.

8. A process for producing a higher molecular weight mono-olefin hydrocarbon from a lower molecular weight hydrocarbon and a cycloparaffin which comprises reacting an olefin with a cycloparaffin of less than five carbon atoms in the ring in the presence of a condensation catalyst under selected pressure within the range of 5 to 40 atmospheres and a selected temperature within the range of −30 to 230° C. effective for the condensation reactions in accordance with the starting hydrocarbons and condensation catalyst employed.

9. A process for producing a higher molecular weight olefin hydrocarbon from a lower molecular weight olefin hydrocarbon and a cycloparaffin which comprises reacting an olefin with a cycloparaffin of less than five carbon atoms in the ring in the presence of a mineral acid condensation catalyst under selected pressure and temperature conditions effective for the condensation reactions in accordance with the starting hydrocarbons and mineral acid catalyst employed.

10. A process for producing a liquid olefin hydrocarbon which comprises reacting a normally gaseous olefin hydrocarbon with a cycloparaffin of less than five carbon atoms in the ring in the presence of a mineral acid condensation catalyst under selected pressure and temperature conditions effective for the condensation reactions in accordance with the starting hydrocarbons and mineral acid catalyst employed.

11. A process for producing a liquid olefin hydrocarbon which comprises reacting a normally gaseous olefin hydrocarbon with a cycloparaffin of less than five carbon atoms in the ring in the presence of a condensation catalyst comprising a metal salt under selected pressure and temperature conditions effective for the condensation reactions in accordance with the starting hydrocarbons and metal-salt catalyst employed.

VLADIMIR N. IPATIEFF.
ARISTID V. GROSSE.

CERTIFICATE OF CORRECTION.

Patent No. 2,273,320. February 17, 1942.

VLADIMIR N. IPATIEFF, ET AL.

It is hereby certified that error appears in the printed specification of the above numbered patent requiring correction as follows: Page 2, second column, line 73, for "propane" read --propene--; and that the said Letters Patent should be read with this correction therein that the same may conform to the record of the case in the Patent Office.

Signed and sealed this 21st day of April, A. D. 1942.

(Seal)

Henry Van Arsdale,
Acting Commissioner of Patents.